Powers & Van Deusen.
Fluid-Meters.

N° 75644

Patented Mar. 17, 1868

Witnesses.
Chas H Smith
Geo. D Walker

Inventor.
John Powers
J B Van Deusen

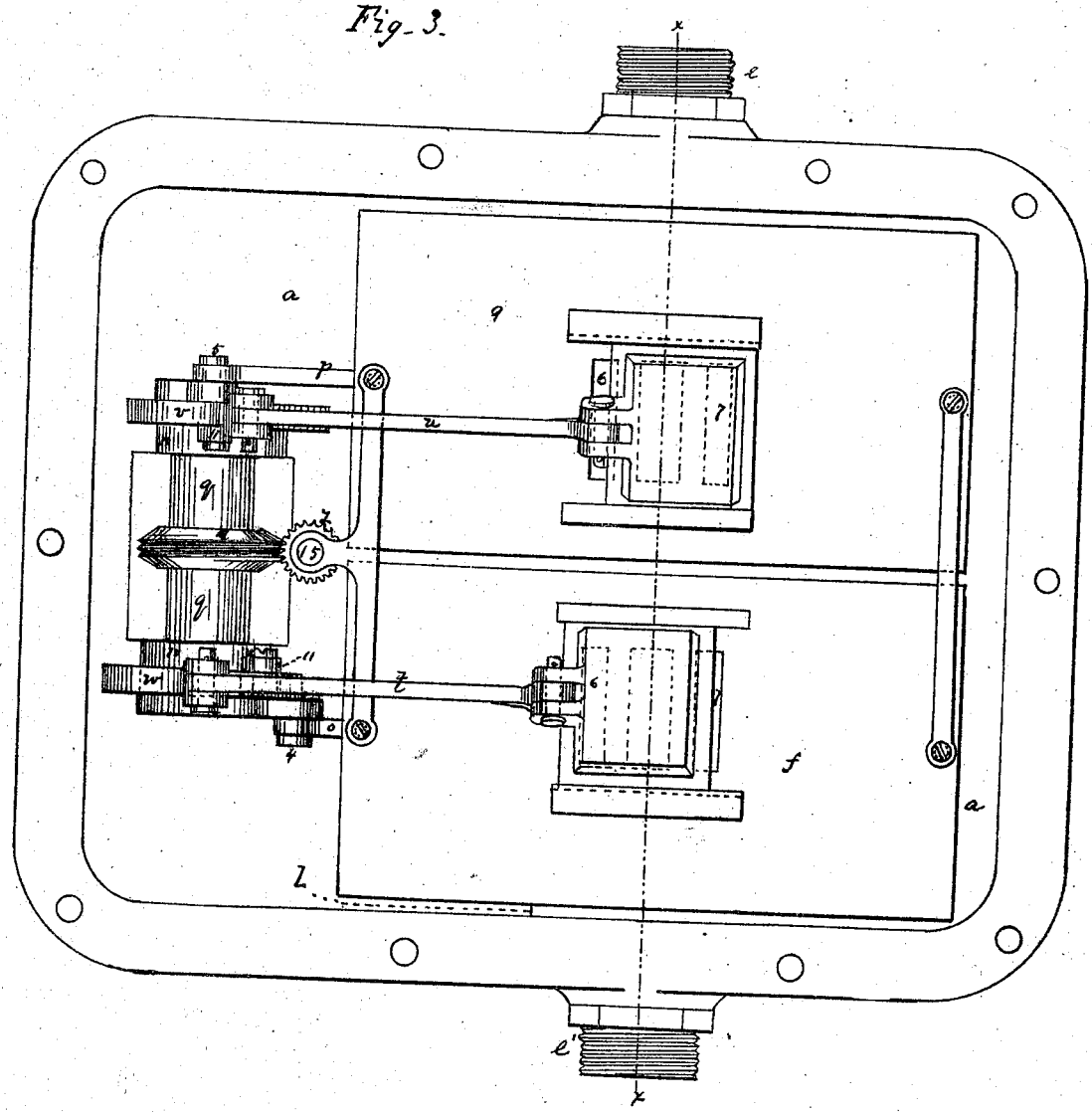

United States Patent Office.

JOHN POWERS AND J. B. VAN DEUSEN, OF NEW YORK, N. Y.

Letters Patent No. 75,644, dated March 17, 1868.

IMPROVEMENT IN FLUID-METERS.

The Schedule referred to in these Letters Patent and making part of the same.

TO ALL WHOM IT MAY CONCERN:

Be it known that we, JOHN POWERS and J. B. VAN DEUSEN, of the city and State of New York, have invented, made, and applied to use, a certain new and useful Improvement in Fluid-Meters; and we do hereby declare the following to be a full, clear, and exact description of the said invention, reference being had to the annexed drawing, making part of this specification, wherein—

Figure 3 is a plan with the cover removed.

Similar marks of reference denote the same parts.

Figure 1:
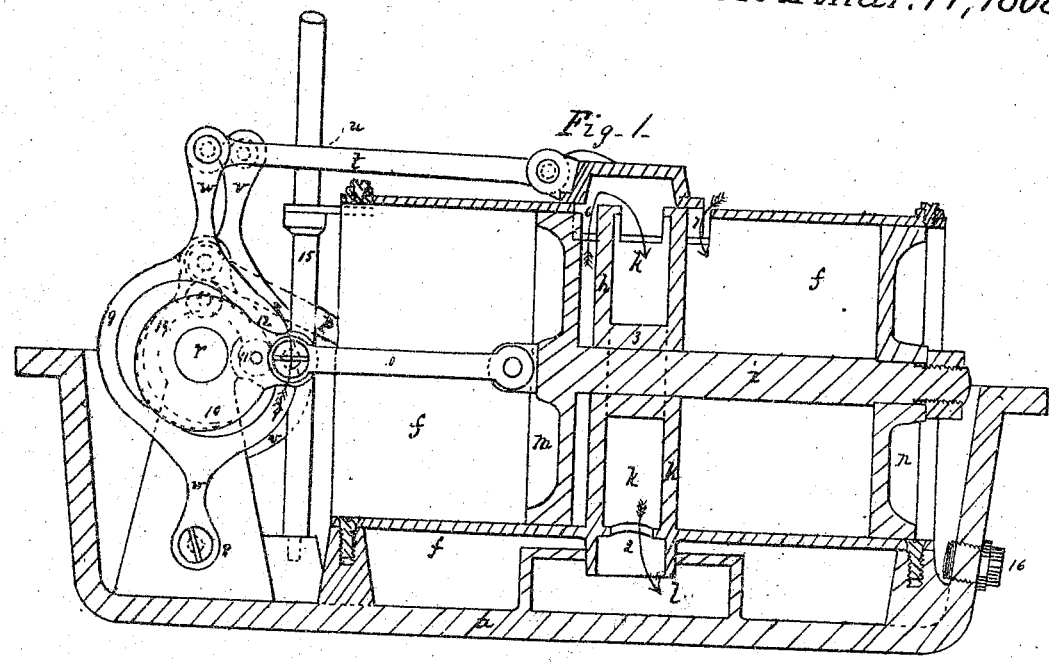
Figure 1 is a vertical longitudinal section of said meter.
Figure 2:
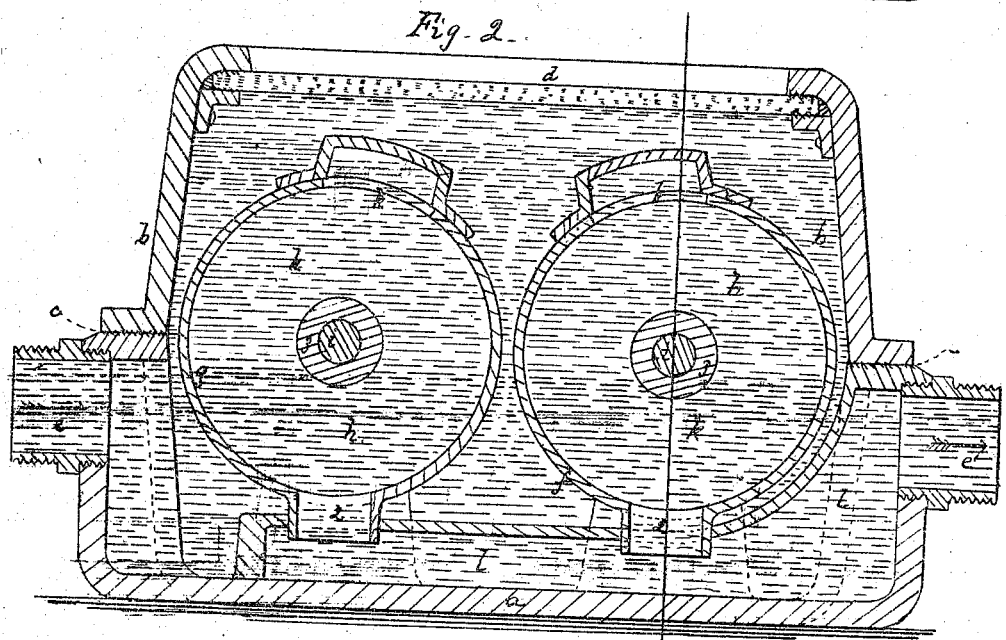
Figure 2 is a transverse section of the same at the line $x\,x$.

The object of this invention is to furnish a reliable and compact measure of the amount of fluid that passes through the apparatus.

Our meter consists in a pair of double-acting cylinders and pistons, the cylinders being open at their ends, and the fluid passing off through a double central head within each cylinder. The pistons are connected to cranks that stand at right angles to each other on a shaft, and the valves of the cylinders are moved by peculiar levers, operated upon by eccentrics upon the shaft. By this construction, the external pressure upon the pistons is balanced, there is no possibility for the valves to become misplaced, and the one piston carries the crank of the other past its dead-centre, so that there is no risk of the meter becoming inoperative by the opposite pressures balancing each other; and our meter is very compact, and of large capacity in proportion to the space occupied by it.

The valves are not covered by any chest, but move upon the cylinders within the general water-space of the meter; hence there is no friction from packings, and the risk of obstruction is much lessened.

In the drawing, $a$ represents the bottom of the enclosing case, $b$ the upper portion. These are united by flanges and bolts, with suitable packing, at $c$. A glass may be introduced at $d$, through which to examine the operation, and see that the meter contained in this case is in proper working order. $e$ is the inlet-pipe, opening into the side of the case $a$. The water fills the entire case, so that the parts of the meter are submerged; and $e'$ is the outlet or delivery-pipe, through which the water passes after going through the meter, as hereafter described.

The cylinders $f$ and $g$ are each formed with open ends, and with a double central partition, $h$, leaving a water-way, $k$, that communicates at 2 with a trunk, $l$, that extends across from the outlet-pipe $e'$. Within each cylinder is a piston-rod, $i$, passing through the tubular guide, 3, that extends across the water-way $k$, and fits the piston-rod sufficiently closely to be water-tight or nearly so; and $m$ and $n$ are pistons upon the ends of the rod $i$, and $o$ and $p$ are connecting-rods to the crank-pins 4 and 5 of the shaft $r$, that is supported in bearings $q$. Said crank-pins 4 and 5 stand at about ninety degrees from each other upon the shaft $r$, in order that the piston of one of the cylinders may carry that of the other past its dead-centre point, and move the valve thereof. Each cylinder is provided with a D or hollow valve, and the ports 6 and 7 open into the cylinder on the respective sides of the central partition $h$. This valve is upon the upper part of the cylinder within the general water-space of the meter. It is not enclosed in any valve-chest, and becomes the communication between the cylinder and the exhaust-water way. The pressure of the fluid is balanced on the outside of the pistons $m\,n$, and the changing of the valve, by means hereafter described, at the end of each stroke, admits the fluid to act between the partition $h$ and one of the pistons, to give motion to the same, while the water that had previously filled the other side of the same cylinder is being forced out through the hollow valve and water-way $k$, and as the stroke is finished, the valve is moved the opposite way, and the action is reversed.

In order to give motion to the respective valves, we employ the connecting-rods $t$ and $u$ to the levers $w$ and $v$. The action in moving the valves corresponding in both cylinders, we will only describe it with reference to the lever $w$ and its valve. The lever $w$ is attached by the fulcrum-pin or screw, 8, and is formed in its middle portion as an elliptical bow or ring, 9, the position of which is diagonal to the lever, (see fig. 1.) The eccentric, 10, on the shaft $r$, is placed relatively to the crank-pin, as shown, and a roller, 11, is let into a notch in the eccentric, so that the surface thereof projects slightly beyond the surface of the eccentric, in order that the lever $w$ may be moved with but little friction by the surface of said roller 11 coming in contact with the interior of the elliptical bow 9. As the crank-pin, 4, moves in the direction of the arrow, fig. 1, the roller, 11, coming into contact with the flattened side of the elliptical bow, as at 12, moves the valve so as to open the induction-port, 6, and allow the eduction through the valve and port 7. The projecting portion of the eccentric, 10, moving after the roller 11, prevents the lever $u$ moving by any accidental jar, or becoming misplaced while the meter is being transported or fitted to place. When the eccentric and roller have moved towards the other end of the elliptical bow, the pistons and connections are in such a position that they have the leverage necessary to insure the movement of the parts while the crank-pin of the first cylinder is passing the dead-centre and the valve is being changed. The shape of the elliptical bow and the position of the eccentric and roller are such that the valve is moved during the last portion of one stroke and the commencement of the next, and the valve is held stationary, and open one side or the other during the larger portion of the stroke.

By this construction it is impossible for the meter to become blocked or inoperative when stopped or started at any part of the stroke, and the operations of the meter are reliable and entirely automatic. The motion of the shaft $r$ is communicated by a worm, $y$, to a pinion, $z$, on a shaft, 15, that connects to any desired indicating-apparatus.

The case $a$ is made deeper than required for the parts of the meter, in order that a receptacle may be formed for sediment and extraneous matter below the working parts, so that they will not be obstructed or injured, and a cock or plug, 16, may be employed for blowing out such sediment.

We do not confine ourselves to the shape of the elliptical bow in the levers $w\ v$, or to that of the eccentric or cam operating upon said lever, so long as the motions specified are communicated to the valves.

We have shown the operative parts of the meter as of brass, but the same may be made of other suitable material adapted to remaining in the water.

What we claim, and desire to secure by Letters Patent, is—

1. The double-acting cylinder, open at the ends, and made with a double partition near the middle, in combination with two pistons, connected by a rod and with the ports 6 and 7, and valve, substantially as and for the purposes set forth.

2. The arrangement of two or more cylinders, constructed as aforesaid, to operate upon one shaft, with two crank-pins, at about ninety degrees to each other, to form a fluid-meter, substantially as specified.

3. The levers $w$ and $v$, connected to the valves, and operated from the shaft $r$ by mechanism, substantially as specified, to move the valves in the manner set forth, in combination with the double-acting cylinders and their pistons, substantially as specified.

4. A D or hollow valve, applied within the water-space of the meter, and above the cylinder, in combination with an exhaust-water way beneath the said valve, substantially as and for the purposes set forth.

5. The trunk $l$, extending across below the cylinders $f\ g$, and connecting the water-ways $k$ with the delivery-pipe $e'$, as and for the purposes specified.

6. The case $a$, formed with a receptacle for sediment, below the operative parts, in combination with a cock or plug for the discharge of said sediment, substantially as set forth.

In witness whereof, we have hereunto set our signatures, this third day of February, A. D. 1868.

JOHN POWERS,
J. B. VAN DEUSEN.

Witnesses:
 CHAS. H. SMITH,
 GEO. D. WALKER.